United States Patent [19]

Suda

[11] Patent Number: 4,919,859

[45] Date of Patent: Apr. 24, 1990

[54] PROCESS OF MAKING AN ACOUSTIC CARBON DIAPHRAGM

[75] Inventor: Yoshihisa Suda, Maebashi, Japan

[73] Assignee: Mitsubishi Pencil Co., Ltd., Tokyo, Japan

[21] Appl. No.: 239,266

[22] Filed: Sep. 1, 1988

[51] Int. Cl.$^5$ .............................................. C01B 31/02

[52] U.S. Cl. .................................. 264/29.5; 264/29.6; 264/42; 264/49; 264/81; 264/85; 264/137; 423/449; 427/227; 427/228; 427/249

[58] Field of Search ..................... 264/29.1, 29.5, 29.6, 264/29.7, 81, 137, 257, 42, 49, 85; 423/449; 427/249, 227, 228

[56] References Cited

U.S. PATENT DOCUMENTS

| | | | |
|---|---|---|---|
| 3,233,014 | 2/1966 | Bickerdike et al. | 264/29.1 |
| 3,238,054 | 3/1966 | Bickerdike et al. | 427/227 |
| 3,317,338 | 5/1967 | Batchelor | 427/249 |
| 3,936,535 | 2/1976 | Boder | 427/228 |
| 4,178,413 | 12/1979 | DeMunda | 427/227 X |

*Primary Examiner*—Jeffery Thurlow
*Assistant Examiner*—Leo B. Tentoni
*Attorney, Agent, or Firm*—Oliff & Berridge

[57] ABSTRACT

A process for producing an acoustic diaphragm of carbonaceous material including the steps of impregnating nonwoven fabric or woven fabric of carbon fiber having a high degree of elasticity with a thermosetting resin, thermally molding it into a diaphragm shape, calcining the shaped fabric in an inert gas atmosphere to obtain a porous carbon molding, heating the porous molding to a uniform temperature, and depositing vapor phase, thermally decomposed carbon upon a surface of the porous molding. The deposited carbon is generated by thermal decomposition of a hydrocarbon-containing material introduced together with a carrier gas. The process produces an acoustic diaphragm having a dense surface layer of carbonized fiber-carbonized thermosetting resin-thermally decomposed carbon, and a porous interior of carbonized fiber bonded together by carbonized resin and the thermally decomposed carbon. Thus, the process permits manufacture of a diaphragm made of a carbon material having a large E/p value with the carbon material mostly made of a carbon fiber having high elasticity and a carbonized residue of a thermosetting resin.

13 Claims, No Drawings

PROCESS OF MAKING AN ACOUSTIC CARBON DIAPHRAGM

BACKGROUND OF THE INVENTION

The present invention relates to a process for producing an acoustic diaphragm made of carbonaceous material. More particularly, the invention relates to a process for producing an acoustic diaphragm of carbonaceous materials having light weight, high elasticity, fast sound transmission velocity and excellent rigidity as compared with a conventional diaphragm used as a speaker and a microphone. Diaphragms produced by the new process exhibit less deformation due to an external force, a small sound distortion, wide sound reproduction range, distinct sound quality, and are suitable for digital audio applications.

It is generally desired to satisfy the following conditions for a diaphragm intended for use as a speaker and as a voice coil bobbin:

(1) small density, (2) large Young's modulus, (3) large propagating velocity of longitudinal waves, (4) adequately large internal loss of vibration, and (5) stability against variation in the atmospheric conditions, and (6) no deformation nor change of properties.

More specifically, a material intended for use as a diaphragm is required to reproduce sound in high fidelity over a broad frequency band. To efficiently and distinctly produce such sound quality, the material should have high rigidity, no distortion such as creep against external stress, and as a high sound propagating velocity. In order to further increase the sound velocity from the equation of $$V=(E/p)^{\frac{1}{2}}$$

where V is sound velocity, E is Young's modulus and p is density, the material should have a small density and a high Young's modulus.

Conventional diaphragm materials include paper (pulp), plastic, and can further contain glass fiber and carbon fiber compositely mixed with the base materials. These materials can also be processed with metal, such as aluminum, titanium, magnesium, beryllium, or boron, metal alloy, metal nitride, metal carbide, or metal boride. However, paper, plastic and their composite materials have a small Young's modulus and small density. Thus, the sound velocities of these materials are low. Vibration division occurs in a specific mode and the frequency characteristics of these materials in the high frequency band are particularly low, resulting in difficulty in producing distinct sound quality. In addition, these materials can be affected by external environments, such as temperature and moisture, which cause deterioration in the quality and ageing fatigue. On the other hand, although metal plates of aluminum, magnesium, titanium, possess sound velocities which are faster than paper or plastic, they have small E/p values and small internal loss of vibration values. These materials exhibit either sharp resonance phenomenon in a high frequency band or ageing fatigue, such as creep, can occur.

Beryllium and boron provide excellent physical properties. Squawkers or tweeters which use beryllium or boron as diaphragms can extend the sound reproduction limit to audible frequency bands or higher, thereby correctly producing natural sound quality without transient phenomenon in the signals in the audible band. However, these materials are scarce natural resources and very expensive, and present difficulties in industrial machining. In particular, it is difficult to produce speakers of large size from boron and/or beryllium.

In addition to these materials, there have been experiments to obtain diaphragms made of carbonaceous material due to large E/p value of carbon materials:

(1) a method for carbonizing a resin sheet or film to graphite only;

(2) a method for shaping and carbonizing a composite material of resin and various carbonaceous powder to graphite, and (3) a method for carbonizing carbon fiber-reinforced plastic to graphite.

Since method (1) has a small carbon yield due to the plastic material employed, a precise product is difficult to obtain and a product having high Young's modulus, like graphite or carbon fiber, cannot be obtained from carbon made of plastic.

Method (2) can produce a product having a high Young's modulus as compared with method (1) by using graphite or carbon fiber, but since it uses various resins to improve moldability, the ratio of the resin carbon to the calcined material is large, thereby causing the Young's modulus of the carbon fiber or graphite to decrease.

In method (3) only the plastic portion is baked and contracted. When the carbon fiber-reinforced plastic is calcined, numerous fine cracks occur among the carbon fibers so that a product in which the carbon fiber and the resin carbon are integrated without defects cannot be obtained. Therefore, this method has such a disadvantage that the function of the carbon fiber is lost.

SUMMARY OF THE INVENTION

Accordingly, an object of the present invention is to provide a process for producing an acoustic diaphragm of carbonaceous material, which can eliminate the above-described drawbacks of conventional materials for diaphragms, which is made of a carbon material having a large E/p value with the carbon material mostly made of carbon fiber having a high degree of elasticity and the residue made of a carbon material having a high degree of elasticity. The process can accurately and inexpensively produce a carbonaceous diaphragm without cracks.

The inventor has invented a process for producing an acoustic diaphragm of carbonaceous materials comprising the steps of impregnating a woven or nonwoven fabric of carbon fiber having a high degree of elasticity with a thermosetting resin, thermally molding it in a diaphragm shape, calcining it in an inert gas atmosphere to obtain a porous carbon molding made of a carbonized fiber-carbonized thermosetting resin carbon. The porous molding is then heated to a uniform temperature, and vapor phase, thermally decomposed carbon generated by thermal decomposition of a hydrocarbon-containing material introduced together with a carrier gas is deposited on the surface of the porous molding. This process produces an acoustic diaphragm possessing a surface made of a dense layer of carbonized fiber-carbonized thermosetting resin-thermally decomposed carbon, and an interior made of a porous material comprising carbonized fiber as a skeleton bonded by the carbonized thermosetting resin carbon.

The diaphragm manufactured by the process of the present invention accurately maintains its size and shape during molding, and exhibits a high degree of elasticity and a high sonic velocity. Because the diaphragm has a porous portion, it is lighter than a product made of a dense substrate and yet is hard to deform.

A process for producing an acoustic diaphragm according to the present invention will now be described.

Suitable high elasticity carbon fibers include nonwoven fabric, such as felt of pitch or polyacrylonitrile series, and woven fabric, such as plain weave fabric, spiral weave fabric or bias weave fabric of polyacrylonitrile, or short fiber, carbon whisker, etc. These fibers are impregnated with a thermosetting resin, such as phenol resins, furan resins, xylene resins, toluene resins, or resorcinol resins. The impregnated fabric of high elasticity carbon fiber is subsequently molded and thermoset in a mold. At this time, the fiber content of the resin is increased, or a porous layer is arbitrarily formed by regulating the air gap amount in the cured material by pressure curing.

Then, the material is molded in necessary size and shape, postcured, and calcined at 500° C. or higher in an inert gas atmosphere to obtain a porous molding made of carbonized fiber-carbonized thermosetting resin carbon. At this time, the carbonized resin carbon is finely cracked upon carbonization and contraction of the thermosetting resin. The quantity of the contained thermosetting resin depends upon the molding shape, the presence or absence of pressure, the state of the carbon fiber employed, and its elasticity value, and is adjusted to the minimum required to prevent the molding from deforming during calcining without completely filling the spaces among the carbon fibers.

The porous molding is first heated by an induction heating system using a high frequency induction furnace or a heating system using a lateral tubular furnace. A hydrocarbon-containing material is introduced together with a carrier gas, such as argon. Upon contact with the heated porous molding the hydrocarbon-containing material thermally decomposes to produce carbon which is deposited on the surface of the porous molding. Suitable hydrocarbon-containing materials include methane, propane, benzene, and acetylene. Ethylene chloride, such as 1,1-dichloroethylene, cis-1,2-dichloroethylene, trans-1,2-dichloroethylene, 1,1,2-trichloroethylene, and ethane chloride, such as 1,1-dichloroethane, 1,2-dichloroethane, 1,1,1-trichloroethane, 1,1,2-trichloroethane, can also be used to produce thermally decomposed carbon at 1100° C., and most preferably 900° C., thereby improving productivity.

It is necessary in this case to maintain all the surfaces of the porous molding at a uniform temperature without a temperature gradient. This permits uniform deposition of the thermally decomposed carbon on the surface of the porous molding. When the porous molding is held at the uniform temperature, the thermally decomposed carbon is preferentially deposited upon the surface of the porous molding. Thus, before the porous layer therein is filled, the spaces among the carbonized fiber-carbonized thermosetting resin carbon at the surface of the porous molding are covered completely. As a result, fine cracks generated during calcining are completely filled and a porous layer of three-dimensional mesh shape is obtained. Depositing the thermally decomposed carbon reinforces the structure by forming a dense, gas impermeable surface layer made of carbonized carbon fiber, carbonized thermosetting resin and thermally decomposed carbon, with the interior being formed of carbonized fiber bonded together with carbonized theremosetting resin carbon to form a skeleton.

The concentration of the hydrocarbon-containing material in the carrier gas depends upon the temperature of the porous molding, the gas pressure and its velocity. 20 vol. % is preferable. The higher the temperature of the porous molding, the lower the concentration of hydrocarbon-containing material is required. The concentration is enhanced if the gas pressure in the vessel for producing the thermally decomposed carbon is lower. Thus, the higher the gas flow velocity, the greater the hydrocarbon-containing material concentration can be. The hydrocarbon-containing material concentration can be increased in order to accelerate the deposition velocity. The carrier gas flow rate can be reduced to enhance the carbon yield. The thermally decomposed carbon can be obtained at a maximum deposition velocity of several mm/hour by this regulation.

By carbon fiber having a high degree of elasticity it is meant the high elasticity carbon fiber sold in the market, having an elasticity value of from 2.7 to $7.0\times10^7$ g/mm$^2$. The elasticity of ordinary carbonized thermosetting resin carbon is 2.0 to $3.3\times10^6$ g/mm$^2$. The elasticity of the thermally decomposed carbon is at least $3.0\times10^6$ g/mm$^2$. Therefore, it is preferable to bond the carbonized carbon fibers together by using the thermally decomposed carbon as much as possible, thereby improving the elasticity as much as possible.

DESCRIPTION OF THE PREFERRED EMBODIMENTS

The present invention will be described by examples of processes for producing an acoustic diaphragm, but the present invention is not limited to these particular examples.

EXAMPLE 1

Plain weave fabric of carbon fiber having an elasticity of $4.0\times10^7$ g/mm$^2$ was immersed in a vessel filled with 100 parts by weight of initial condensate of furfuryl alcohol/furfural resin (VF-302 produced by Hitachi Chemical Co., Ltd., Japan) and 0.8 part by weight of hardener ($A_3$ hardener). The fabric was then passed between two rolls regulated at its gap, and compressed air was blown to remove excess resin. Then, the fabric was interposed between a recess mold and a projecting mold of diaphragm shape, held in the molds at 80° C. for 5 min. to cure the resin and mold it into a diaphragm shape. The obtained molding was postcured at 150° C. for 30 min. in an air oven, and calcined at a temperature rising velocity of 200° C./hour up to 1000° C. in a calcining furnace in a nitrogen gas atmosphere to obtain a calcined molding having a diaphragm shape. The calcined molding so prepared exhibited no change in its size and shape, and the carbonization ratio was 80 parts by weight of carbonized carbon fiber and 7 parts by weight of carbonized thermosetting resin carbon.

The calcined molding was heated by an induction heating system using a high frequency induction furnace to deposit thermally decomposed carbon. The hydrocarbon-containing material used was cis-1,2-dichloroethylene, the carrier gas was argon gas, the hydrocarbon material concentration was 13 vol. %, the gas flow rate was 400 m./min., the molding temperature was held at 900° C., and the thermally decomposed carbon was deposited for 0.5 hour to obtain a carbon diaphragm.

The carbon ratio of the diaphragm so prepared was 80 parts by weight of carbonized carbon fiber, 7 parts by weight of carbonized thermosetting resin carbon, and 12 parts by weight of thermally decomposed carbon. When a section of the dense layer of the diaphragm was observed by a polarizing microscope, a layer of thermally decomposed carbon of approx. 0.1 mm was observed on the carbon fiber. A flat test piece having the same thickness was produced under the same conditions as this diaphragm, and various values were measured. The density was 1.34 g/cm$^3$, the elasticity was 220 GPa, and the sonic velocity was 12800 m/sec.

EXAMPLE 2

A molding was prepared under the same conditions as those used in Example 1. This molding was heated by an external heating system using a lateral tubular furnace, and thermally decomposed carbon was deposited. The hydrocarbon-containing material was propane, the carrier gas was argon gas, the hydrocarbon containing material concentration was 15 vol. %, the gas flow rate was 430 ml/min., the molding temperature was held at 1300° C., and the thermally decomposed carbon was deposited for 1 hour to obtain a carbon diaphragm.

The carbon ratio of the obtained diaphragm was 80 parts by weight of carbonized carbon fiber, 7 parts by weight of carbonized thermosetting resin carbon and 18 parts by weight of thermally decomposed carbon. When a section of the dense layer of the diaphragm was observed by a polarizing microscope, a layer of thermally decomposed carbon of approx. 0.25 mm was observed on the carbon fiber.

A flat test piece having the same thickness was produced using the same conditions as this diaphragm, and various values were measured. The density was 1.49 g/cm$^3$, the elasticity was 200 GPa, and the sonic velocity was 11600 m/sec.

What is claimed is:

1. A process for producing an acoustic diaphragm of carbonaceous material comprising the steps of:

impregnating a member selected from the group consisting of nonwoven fabric of carbon fiber having high elasticity and woven fabric of carbon fiber having high elasticity with thermosetting resin to form an impregnated carbon fiber fabric;

thermally molding said impregnated carbon fiber fabric into a diaphragm shape to form a molding, calcining said molding in an inert gas atmosphere to obtain a porous carbon molding made of carbonized fiber and carbonized thermosetting resin, heating said porous carbon molding to a uniform temperature, and depositing vapor phase carbon upon a surface of said porous carbon molding, said carbon being generated by thermal decomposition of a hydrocarbon-containing material introduced together with a carrier gas, to produce an acoustic diaphragm having a surface comprising a dense layer of carbonized fiber-carbonized thermosetting resin carbon-thermally decomposed carbon, and an interior comprising a porous material of carbonized fiber bonded to the carbonized thermosetting resin carbon and the thermally decomposed carbon.

2. The process according to claim 1, wherein said carbon fiber is selected from the group consisting of polymer organic fiber, carbon fiber obtained from low molecular weight fiber, and whisker obtained by a vapor phase growing method.

3. The process according to claim 1, wherein said thermosetting resin is a monomer or initial condensate selected from the group consisting of, furan resins, phenol resins, xylene resins, toluene resins, resorcinol resins, resol resins and novolak resins.

4. The process according to claim 1, wherein said hydrocarbon is selected from the group consisting of methane, propane, benzene and acetylene.

5. The process according to claim 1, wherein said hydrocarbon containing material is selected from the group consisting of 1,1-dichloroethylene, cis-1,2-dichloroethylene, trans-1,2-dichloroethylene, 1,1,2-trichloro-ethylene, 1,1-dichloroethane, 1,2-dichloroethane, 1,1,1-trichloroethane, and 1,1,2-trichloroethane.

6. The process according to claim 1, wherein said carrier gas is an inert gas.

7. The process according to claim 1, wherein said calcining step is performed at a temperature of at least 500° C.

8. The process according to claim 1, wherein said dense layer is a gas impermeable layer prepared by filling thermally decomposed carbon in pores at a surface of said porous carbon molding.

9. The process according to claim 1, wherein said dense layer is obtained by depositing the thermally decomposed carbon on a porous molding having a three-dimensional mesh shape made of a carbonized fiber skeleton connected by carbonized thermosetting resin carbon in said porous molding.

10. The process of claim 2 wherein said polymer organic fiber is polyacrylonitrile.

11. The process of claim 2 wherein said carbon fiber is selected from the group consisting of pitch and graphited fiber made from pitch.

12. The process of claim 3 wherein said thermosetting resin is a furan resin selected from the group consisting of furfuryl alcohol resin and furfuryl alcohol/furfural cocondensate resin.

13. The process of claim 6 wherein said inert gas is selected from the group consisting of hydrogen gas, nitrogen gas and argon gas.

* * * * *